(12) United States Patent
Ranganathan et al.

(10) Patent No.: US 11,084,437 B2
(45) Date of Patent: Aug. 10, 2021

(54) VEHICLE CONSOLE WITH COUPLED MOTION AND ENHANCED STORAGE CAPABILITIES

(71) Applicant: FORD GLOBAL TECHNOLOGIES, LLC, Dearborn, MI (US)

(72) Inventors: Shivraj Karthik Ranganathan, Royal Oak, MI (US); Manjil M Kale, Canton, MI (US); Robert Michael Coury, Belleville, MI (US); Gary D. Mullen, Plymouth, MI (US); Anthony Ligi, Jr., Chelsea, MI (US); Glenn Biddinger, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 33 days.

(21) Appl. No.: 16/742,541

(22) Filed: Jan. 14, 2020

(65) Prior Publication Data
US 2020/0148141 A1 May 14, 2020

Related U.S. Application Data

(62) Division of application No. 15/994,122, filed on May 31, 2018, now Pat. No. 10,756,918, which is a
(Continued)

(51) Int. Cl.
*B60R 19/34* (2006.01)
*B60R 16/03* (2006.01)
(Continued)

(52) U.S. Cl.
CPC ............ *B60R 16/03* (2013.01); *B60N 2/0232* (2013.01); *B60N 2/06* (2013.01); *B60N 3/10* (2013.01);
(Continued)

(58) Field of Classification Search
CPC ............... B60R 7/04; B60R 2011/0007; B60R 2011/0082; B60N 2/06; B60N 2/753; B60N 2/793; A47B 2021/0307; A47B 2021/0321
See application file for complete search history.

(56) References Cited

U.S. PATENT DOCUMENTS 5,564,668 A * 10/1996 Crowe, II ............... B60R 11/02
248/284.1
5,897,155 A    4/1999 Kerner et al.
(Continued)

FOREIGN PATENT DOCUMENTS

DE        10202578 A1    8/2003
FR        2899163 B1     10/2007
(Continued)

OTHER PUBLICATIONS

English Machine Translation of DE10202578A1 dated Aug. 7, 2003.
(Continued)

*Primary Examiner* — Kiran B Patel
(74) *Attorney, Agent, or Firm* — David Coppiellie; King & Schickli, PLLC

(57) ABSTRACT

An apparatus for an interior vehicle compartment includes a seat adapted for moving in a travel direction and a movable console. The movable console includes a holder for removably receiving and holding a mobile computer having a display. The holder may be displaced between a stowed position and a deployed position. The display is presented for viewing by a vehicle passenger seated in the seat in both of those positions.

16 Claims, 14 Drawing Sheets

Related U.S. Application Data division of application No. 15/375,992, filed on Dec. 12, 2016, now Pat. No. 10,011,240.

(51) Int. Cl.
| | |
|---|---|
| *B60R 7/04* | (2006.01) |
| *B60N 3/10* | (2006.01) |
| *B60N 2/02* | (2006.01) |
| *B60N 2/06* | (2006.01) |
| *B60R 11/02* | (2006.01) |
| *B60R 11/00* | (2006.01) |

(52) U.S. Cl.
CPC ............... *B60N 3/101* (2013.01); *B60R 7/04* (2013.01); *B60R 11/0252* (2013.01); *B60R 2011/0007* (2013.01)

(56) References Cited

U.S. PATENT DOCUMENTS

| | | | |
|---|---|---|---|
| 5,951,084 A | 9/1999 | Okazaki et al. | |
| 5,996,866 A | 12/1999 | Susko et al. | |
| 6,010,195 A | 1/2000 | Masters et al. | |
| 6,032,587 A * | 3/2000 | Salenbauch | B60N 3/002 |
| | | | 108/44 |
| 6,032,840 A * | 3/2000 | Gregory | B60R 7/04 |
| | | | 220/23.86 |
| 6,102,476 A * | 8/2000 | May | A47B 21/00 |
| | | | 297/217.3 |
| 6,135,529 A | 10/2000 | De Angelis et al. | |
| 6,203,088 B1 | 3/2001 | Fernandez et al. | |
| 6,369,529 B1 | 4/2002 | McClintock et al. | |
| 6,381,133 B1 * | 4/2002 | Chen | B60R 11/0252 |
| | | | 248/918 |
| 6,619,738 B1 | 9/2003 | Filipovich | |
| 7,455,016 B2 * | 11/2008 | Perin | B43L 3/008 |
| | | | 108/44 |
| 7,481,475 B1 | 1/2009 | Lim et al. | |
| 7,793,597 B2 * | 9/2010 | Bart | B60N 3/002 |
| | | | 108/44 |
| 8,196,985 B2 * | 6/2012 | Penner | B60R 7/04 |
| | | | 296/24.34 |
| 8,616,605 B2 | 12/2013 | Hipshier et al. | |
| 8,714,613 B1 | 5/2014 | Gillis et al. | |
| 9,156,407 B1 | 10/2015 | Kramer et al. | |
| 9,428,118 B1 * | 8/2016 | Rawlinson | B60N 3/002 |
| 9,862,327 B2 * | 1/2018 | Huebner | B60R 11/0252 |
| 9,878,671 B2 | 1/2018 | Murray et al. | |
| 10,273,009 B2 * | 4/2019 | Fishel | A47B 23/001 |
| 2002/0190171 A1 | 12/2002 | Stock | |
| 2003/0155786 A1 * | 8/2003 | Kim | B60R 7/04 |
| | | | 296/24.34 |
| 2003/0234550 A1 * | 12/2003 | Brooks | B60R 11/0211 |
| | | | 296/24.46 |
| 2004/0026947 A1 * | 2/2004 | Kitano | B60R 11/0211 |
| | | | 296/24.34 |
| 2005/0146171 A1 | 7/2005 | Morabito et al. | |
| 2006/0006703 A1 | 1/2006 | Harland | |
| 2006/0071497 A1 * | 4/2006 | Radu | B60R 7/04 |
| | | | 296/24.34 |
| 2006/0085940 A1 * | 4/2006 | Chernoff | B60S 1/64 |
| | | | 15/313 |
| 2007/0075558 A1 * | 4/2007 | Kim | B60N 2/793 |
| | | | 296/24.34 |
| 2007/0075559 A1 | 4/2007 | Sturt | |
| 2007/0085363 A1 | 4/2007 | Sturt et al. | |
| 2007/0158979 A1 * | 7/2007 | Saberan | B60N 2/06 |
| | | | 297/47 |
| 2008/0054145 A1 * | 3/2008 | Lipman | B60R 11/02 |
| | | | 248/242 |
| 2008/0079279 A1 * | 4/2008 | Spykerman | B60N 2/793 |
| | | | 296/24.34 |
| 2009/0026197 A1 | 1/2009 | Chou et al. | |
| 2009/0058120 A1 | 3/2009 | Ioka et al. | |
| 2009/0174209 A1 * | 7/2009 | Lota | B60R 11/02 |
| | | | 296/24.34 |
| 2009/0183935 A1 | 7/2009 | Tsuchiya | |
| 2010/0013285 A1 | 1/2010 | Stanz et al. | |
| 2010/0072767 A1 | 3/2010 | D'Alessandro | |
| 2010/0078954 A1 * | 4/2010 | Liu | B60N 2/793 |
| | | | 296/24.34 |
| 2010/0090491 A1 | 4/2010 | Hispshier et al. | |
| 2010/0156129 A1 * | 6/2010 | Evans | B60R 7/04 |
| | | | 296/24.34 |
| 2010/0215188 A1 * | 8/2010 | Wilcox | H04B 1/082 |
| | | | 381/86 |
| 2010/0260350 A1 * | 10/2010 | Chutorash | B60K 35/00 |
| | | | 381/86 |
| 2011/0140472 A1 | 6/2011 | Vander Sluis et al. | |
| 2011/0278419 A1 | 11/2011 | Sovis | |
| 2011/0278874 A1 | 11/2011 | Lucas | |
| 2011/0309650 A1 | 12/2011 | Seibold et al. | |
| 2012/0132778 A1 | 5/2012 | Nakamura et al. | |
| 2013/0001988 A1 | 1/2013 | Lucas | |
| 2013/0057011 A1 | 3/2013 | Yamagishi et al. | |
| 2013/0112831 A1 | 5/2013 | Kong | |
| 2013/0278033 A1 | 10/2013 | Tame et al. | |
| 2014/0049085 A1 | 2/2014 | Seibold | |
| 2014/0091589 A1 * | 4/2014 | Mather | B60R 7/04 |
| | | | 296/37.14 |
| 2014/0091604 A1 * | 4/2014 | Chatrenet | B64D 11/0689 |
| | | | 297/217.3 |
| 2014/0263920 A1 | 9/2014 | Anticuar et al. | |
| 2014/0291473 A1 | 10/2014 | Mischer et al. | |
| 2015/0083882 A1 | 3/2015 | Stutika et al. | |
| 2015/0222313 A1 | 8/2015 | Rassent et al. | |
| 2016/0027423 A1 | 1/2016 | Deuel et al. | |
| 2016/0082895 A1 * | 3/2016 | Wirkner | B60R 11/0241 |
| | | | 224/544 |
| 2016/0090011 A1 | 3/2016 | Stutika et al. | |
| 2016/0123793 A1 * | 5/2016 | Kolich | G01G 19/4142 |
| | | | 177/1 |
| 2016/0344221 A1 | 11/2016 | Kramer et al. | |
| 2017/0001570 A1 | 1/2017 | Murray et al. | |
| 2017/0028934 A1 | 2/2017 | Helot et al. | |
| 2017/0072873 A1 | 3/2017 | Brunard | |
| 2017/0166093 A1 | 6/2017 | Cziomer et al. | |
| 2017/0282810 A1 | 10/2017 | Parra Becerra et al. | |
| 2017/0324853 A1 | 10/2017 | Ranganathan et al. | |
| 2018/0162283 A1 * | 6/2018 | Ranganathan | B60R 7/043 |
| 2018/0222394 A1 * | 8/2018 | Huebner | B60N 3/101 |
| 2018/0244183 A1 * | 8/2018 | Ruiz | F16M 11/38 |
| 2019/0184885 A1 * | 6/2019 | Preisler | B60N 2/68 |
| 2019/0248294 A1 * | 8/2019 | Persson | B60R 7/04 |
| 2019/0367072 A1 * | 12/2019 | Hansen | B62D 1/183 |
| 2020/0408005 A1 * | 12/2020 | Santillan gutierrez | |
| | | | E05B 83/32 |

FOREIGN PATENT DOCUMENTS

| | | |
|---|---|---|
| FR | 2929895 A1 | 10/2009 |
| JP | 2000255323 A | 9/2000 |
| WO | 2000043232 A1 | 7/2000 |

OTHER PUBLICATIONS

English Machine Translation of FR2899163B1 dated Oct. 5, 2007.
English Machine Translation of FR2929895A1 dated Oct. 16, 2009.
Ricksusedautoparts; 04 05 Ford Ranger L. Front Seat Super Cab Bench 60/40 Manual Cloth 421071; Aug. 22, 2016, pp. 4 of 4, eBAY.
English Machine Translation of JP2000255323A dated Sep. 19, 2000.
Office action dated Nov. 21, 2018 for U.S. Appl. No. 15/375,875, filed Dec. 12, 2016.
Office action dated Feb. 25, 2019 for U.S. Appl. No. 15/375,875, filed Dec. 12, 2016.
Office action dated Sep. 20, 2019 for U.S. Appl. No. 15/994,122, filed May 31, 2018.
Notice of Allowance dated Dec. 9, 2019 for U.S. Appl. No. 15/994,122, filed May 31, 2018.

(56) References Cited

OTHER PUBLICATIONS

Office action dated May 16, 2018 for U.S. Appl. No. 15/375,875, filed Dec. 12, 2016.
Notice of Allowance dated Apr. 27, 2018 for U.S. Appl. No. 15/375,992, filed Dec. 12, 2016.
Notice of Allowance dated May 17,2019 for U.S. Appl. No. 15/375,875, filed Dec. 12, 2016.

* cited by examiner

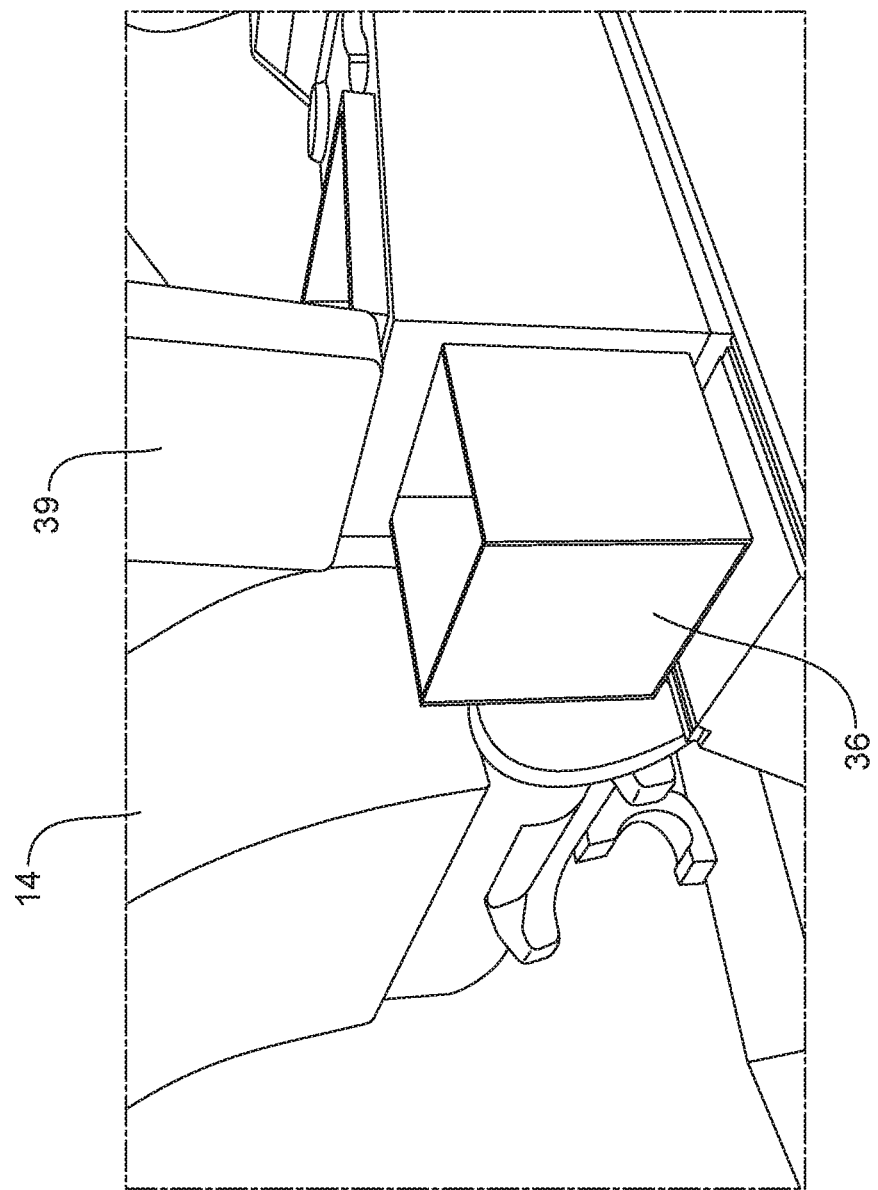

VEHICLE CONSOLE WITH COUPLED MOTION AND ENHANCED STORAGE CAPABILITIES

This is a divisional application of prior U.S. patent application Ser. No. 15/994,122 (now U.S. Pat. No. 10,576,918), filed on May 31, 2018, which is also a divisional application of prior U.S. patent application Ser. No. 15/375,992 (now U.S. Pat. No. 10,011,240) filed on Dec. 12, 2016.

TECHNICAL FIELD

This document relates generally to the motor vehicle field and, more particularly, to a console with a vehicle coupled for movement with a vehicle seat, and also providing for enhanced storage capabilities.

BACKGROUND

Consoles in the interior compartment of a motor vehicle are typically fixed relative to the passenger or driver seat. Hence, movement of the seat relative to the fixed console to achieve a comfortable position may not position the driver or passenger optimally for accessing controls or storage locations (bins, cupholders, etc.) associated with the console. A typical console also includes a fixed "pass through" storage bin that would not allow for movement. Furthermore, the console, if moved forward, would not be readily accessible by rear passengers in the vehicle.

Accordingly, a need is identified for a console that addresses the issue of driver or passenger access when the corresponding seat is moved to and fro in a travel direction, and which may also independently provide for enhanced storage capabilities.

SUMMARY

According to a first aspect of the disclosure, an apparatus for an interior vehicle compartment comprises a seat adapted for moving within the interior vehicle compartment in a travel direction. A console also within the interior compartment is coupled to the seat. The console includes a collapsible portion for collapsing as a body portion of the console travels with the movable seat in the travel direction.

In one embodiment, the collapsible portion comprises a pass through storage bin having an open upper end. The volume of the pass through storage bin changes based on a position of the body portion of the console in a travel direction. The collapsible portion may include sidewalls at least partially received within the body portion of the console, which sidewalls may comprise a reticulated material.

The apparatus may further include a base for supporting the console. The base may include a forward portion to which a front end of the collapsible portion is attached. The base may be stationary relative to the console, and may house components, such as HVAC ducts, electronic components or wiring, or other auxiliary equipment.

In one embodiment, the console comprises a holder for removably receiving a mobile computer having a display. The holder has a stowed position and a deployed position wherein the holder presents the display for viewing by a vehicle passenger seated in the movable seat. The body portion of the console may also include a rear slide drawer including a tilting door for facilitating access by rear passengers in the interior vehicle compartment.

Another aspect of the disclosure pertains to an apparatus for an interior vehicle compartment including a floor having a seat adapted for moving in a travel direction and a console for coupling with the movable seat. A stationary base is provided for housing auxiliary components (such as HVAC ducts, wires, etc.). The stationary base extends above the floor and supporting the console for movement in the travel direction, such as by sliding.

In one embodiment, the stationary base may have a length in a travel direction that is greater than a length of a body of the console in the travel direction. The stationary base may include spaced guide tracks for guiding the console. The console may further comprise: (a) a holder for removably receiving a handheld mobile computer having a display, the holder having a stowed position and a deployed position wherein the holder presents the display for viewing by a vehicle passenger seated in the movable seat; or (b) a rear slide drawer including a tilting door.

According to yet a further aspect of the disclosure, an apparatus for an interior vehicle compartment includes a seat adapted for moving in a travel direction. A console is coupled to the movable seat. The console includes a holder for removably receiving and holding a mobile computer having a display, the holder having a stowed position and a deployed position wherein the holder presents the display for viewing by a vehicle passenger seated in the movable seat.

In one embodiment, the console includes a tray for receiving the holder in the stowed position. The console may also be adapted for guiding the holder from the stowed position to the deployed position. The console may be coupled to the movable seat by a stepped interface, or a seat actuator for moving the seat in the travel direction and a console actuator for moving the console in the travel direction may be adapted for operating in a coordinated or synchronized manner.

Still a further aspect of the disclosure pertains to an apparatus for an interior vehicle compartment including a seat for moving in a travel direction and a console for moving in the travel direction. The console includes a rear slide drawer including a tilting door. The drawer may thus be slid rearwardly relative to the console and the door tilted to facilitate access by passengers in a rear portion of the interior vehicle compartment.

Yet a further aspect of the disclosure pertains to an apparatus for an interior vehicle compartment including a movable seat and console adapted for coupling with the movable seat. A stepped interface is provided for linking the console to the movable seat. In one possible embodiment, the stepped interface comprises a pair of brackets, each including a lower portion adapted for connecting to a portion of the movable seat, an intermediate portion above the lower portion extending transverse to the direction of travel, and an upper portion above the intermediate portion for connecting with the console.

An aspect of the disclosure also pertains to an apparatus for an interior vehicle compartment including a seat movable in a travel direction and a seat actuator for moving the seat in the travel direction. A console is provided and movable in the travel direction. A console actuator is also provided for moving the console in the travel direction in coordination with the movement of the seat.

In one embodiment, a controller is provided for coordinating the actuation of the console actuator and the seat actuator. The seat and console actuators may comprise motors for causing the coordinated movement.

BRIEF DESCRIPTION OF THE DRAWING FIGURES

The accompanying drawing figures incorporated herein and forming a part of the specification, illustrate several aspects of the console with coupled motion and enhanced storage capabilities and, together with the description, serve to explain certain principles thereof. In the drawing figures.

Figure 4:
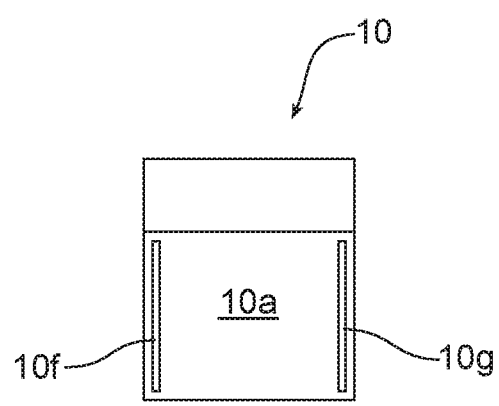
Figure 5:
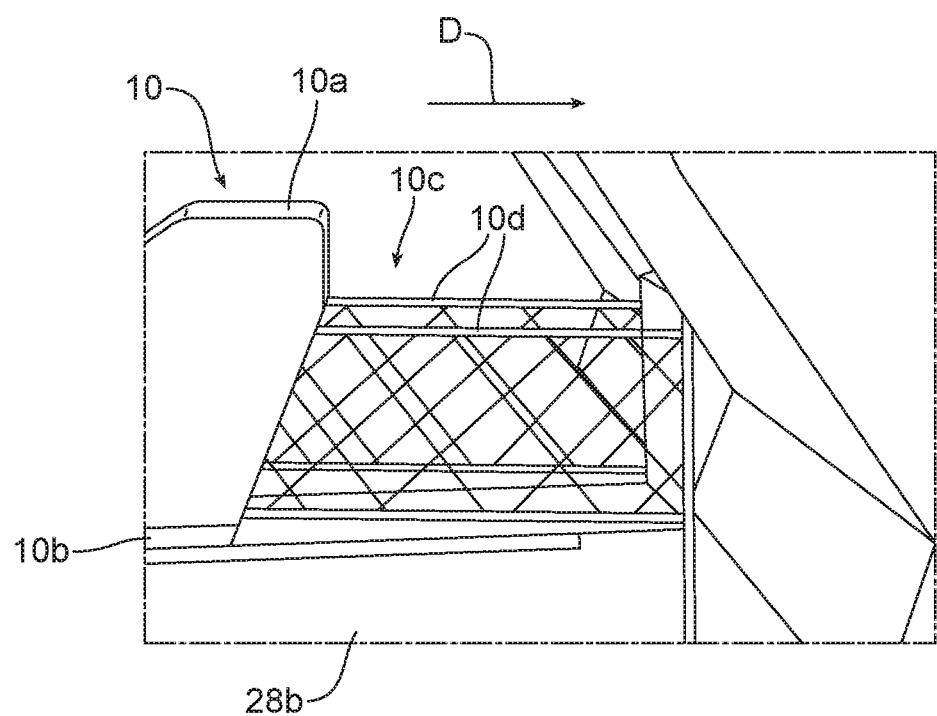
Figure 5A:
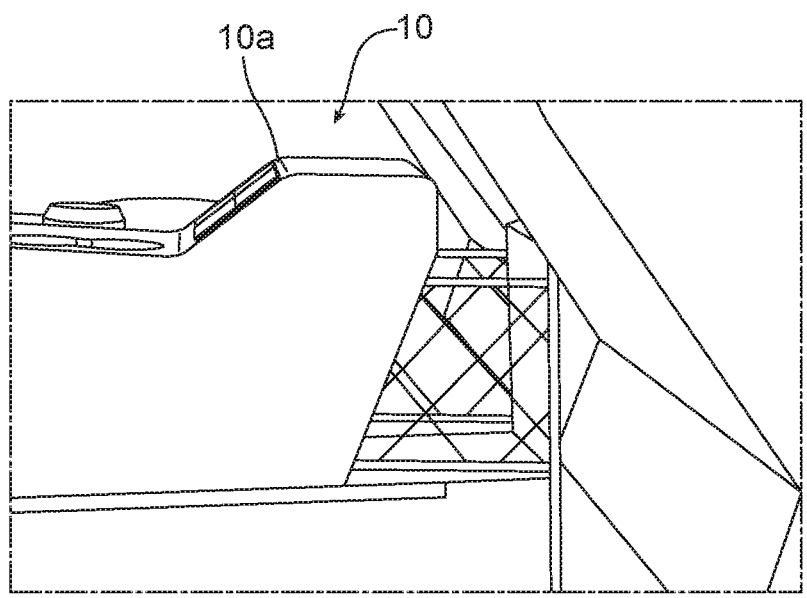
Figure 6:
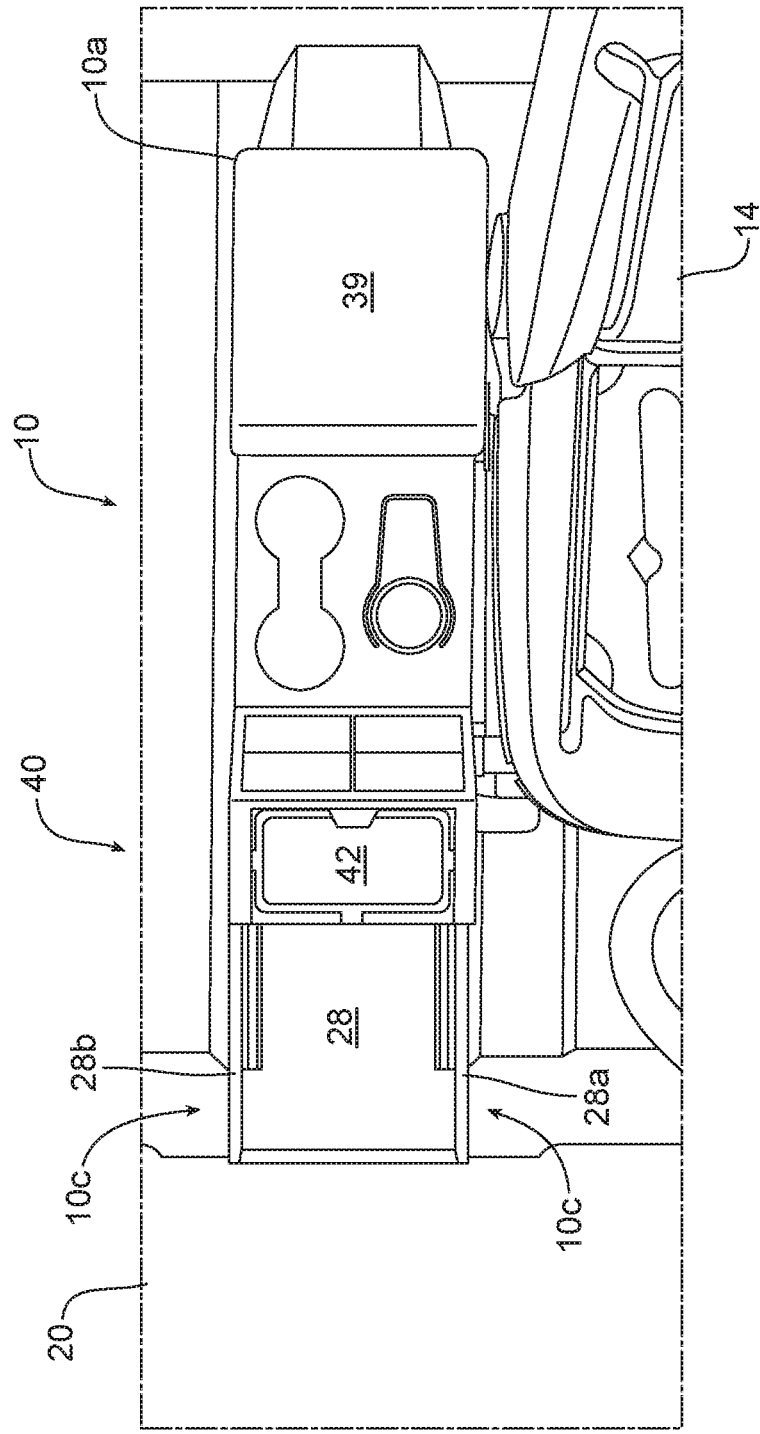
Figure 7:
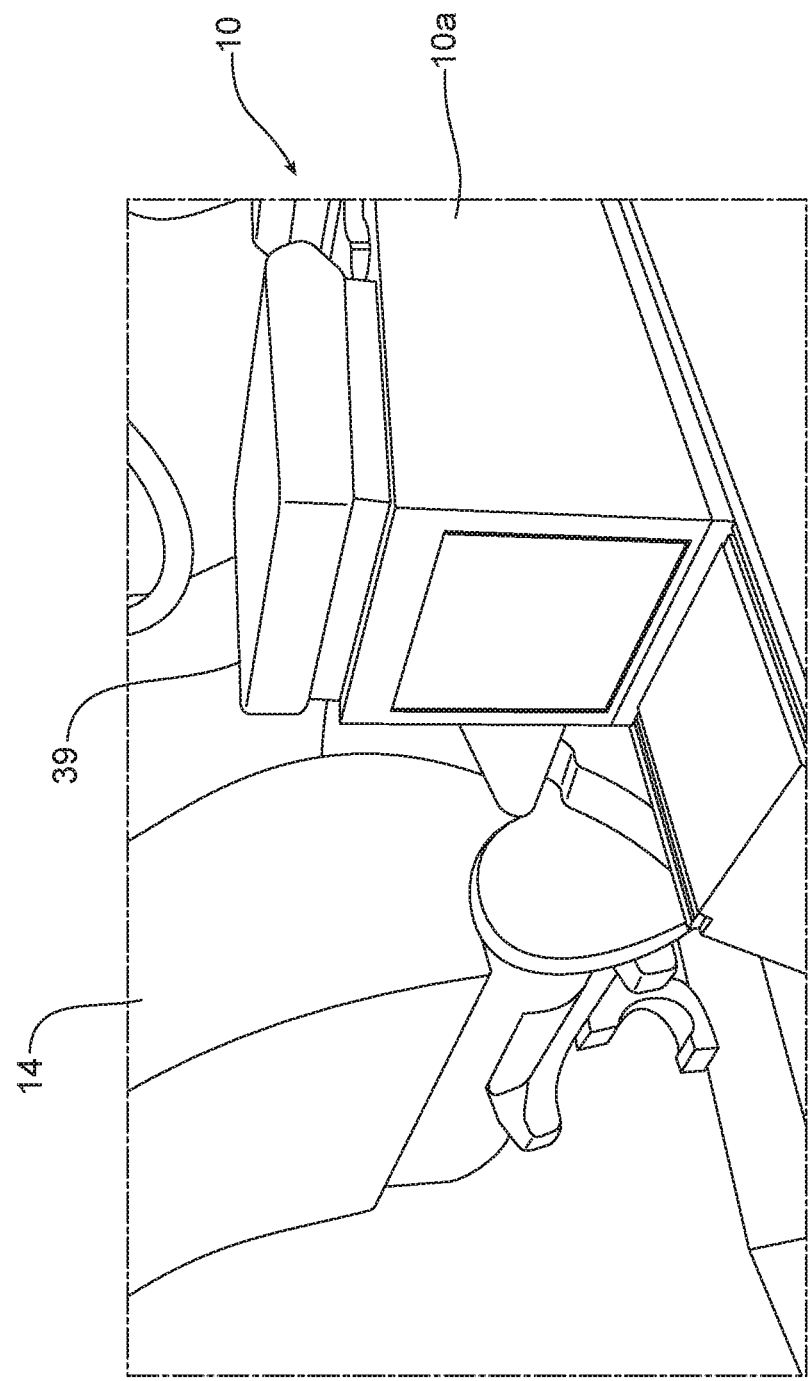
Figure 7B:
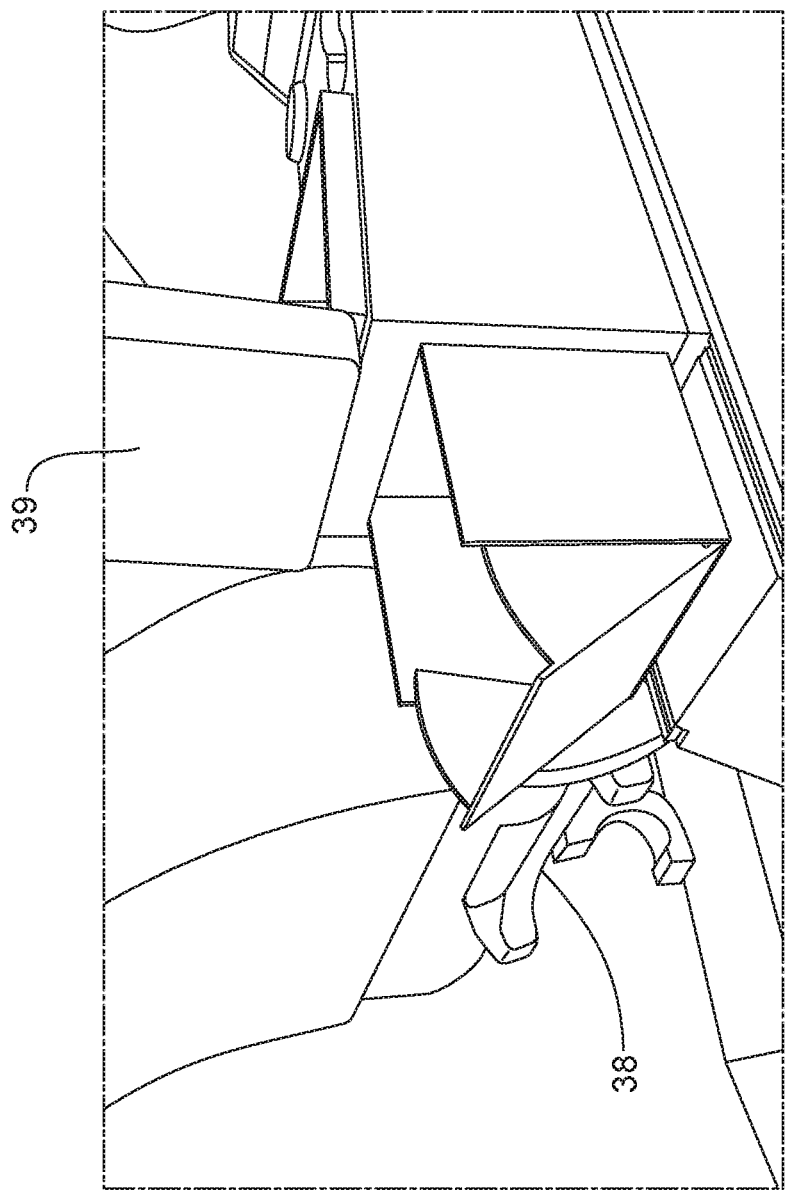
Figure 8:
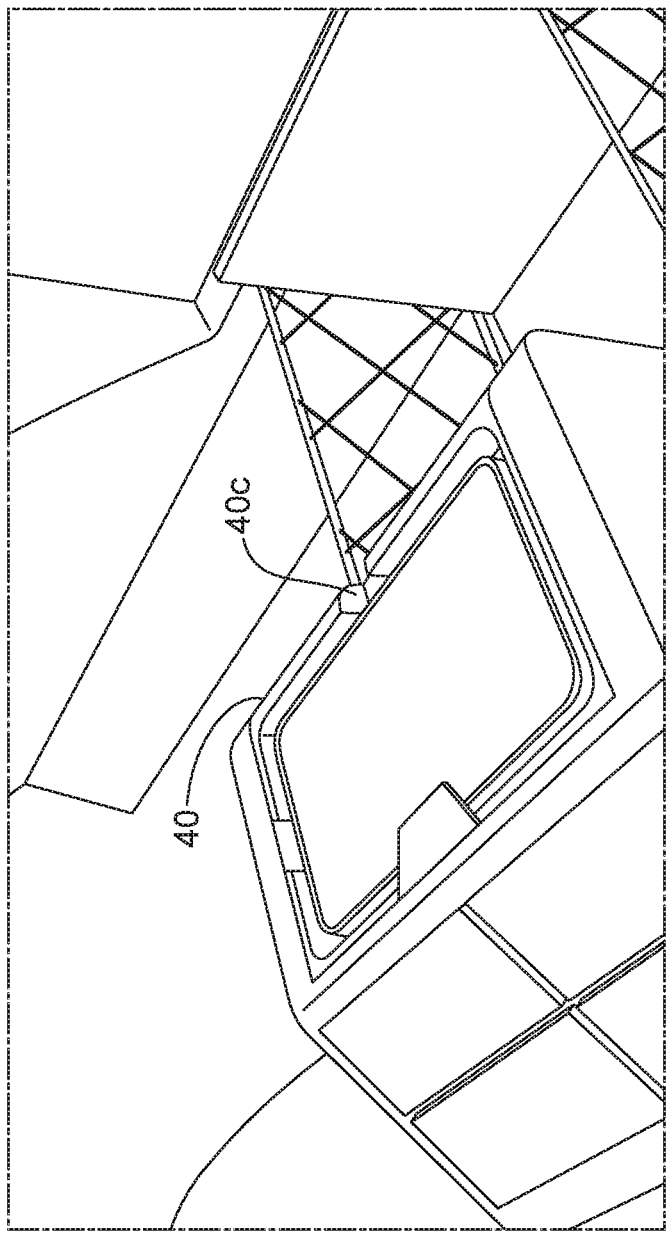
Figure 8A:
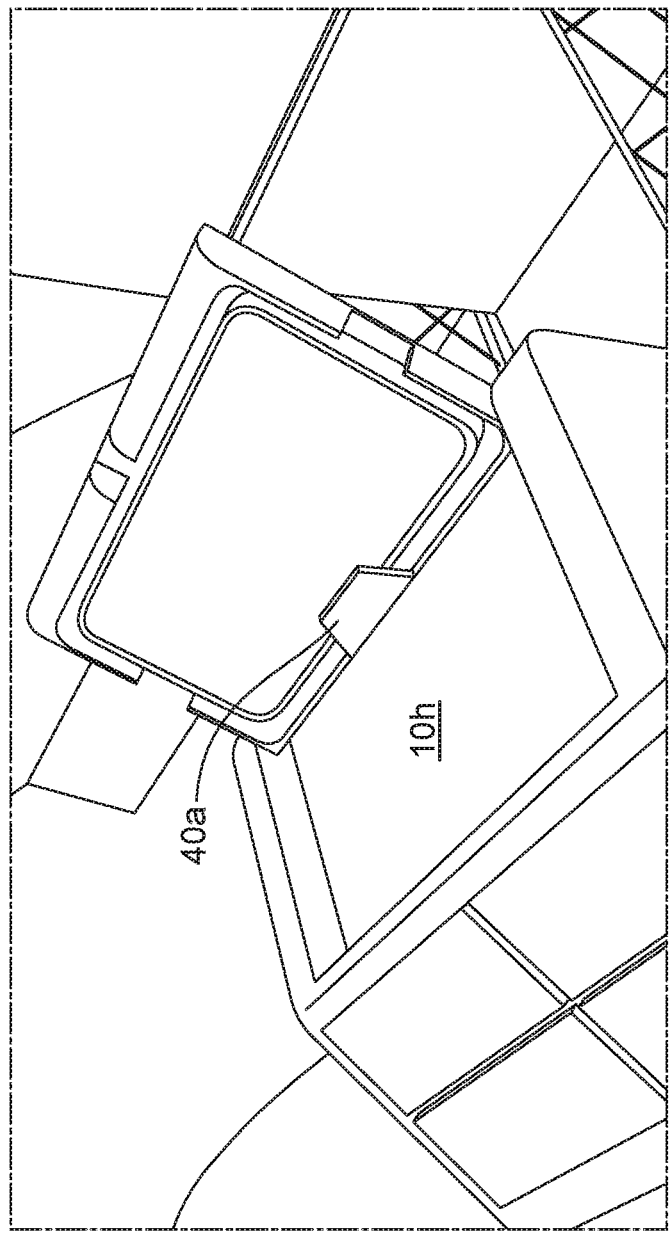
Figure 8B:
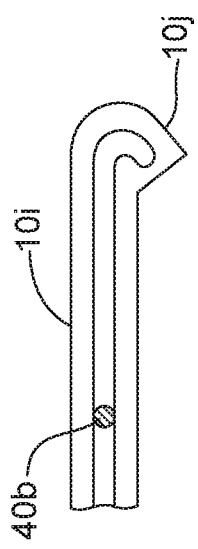
Figure 9:
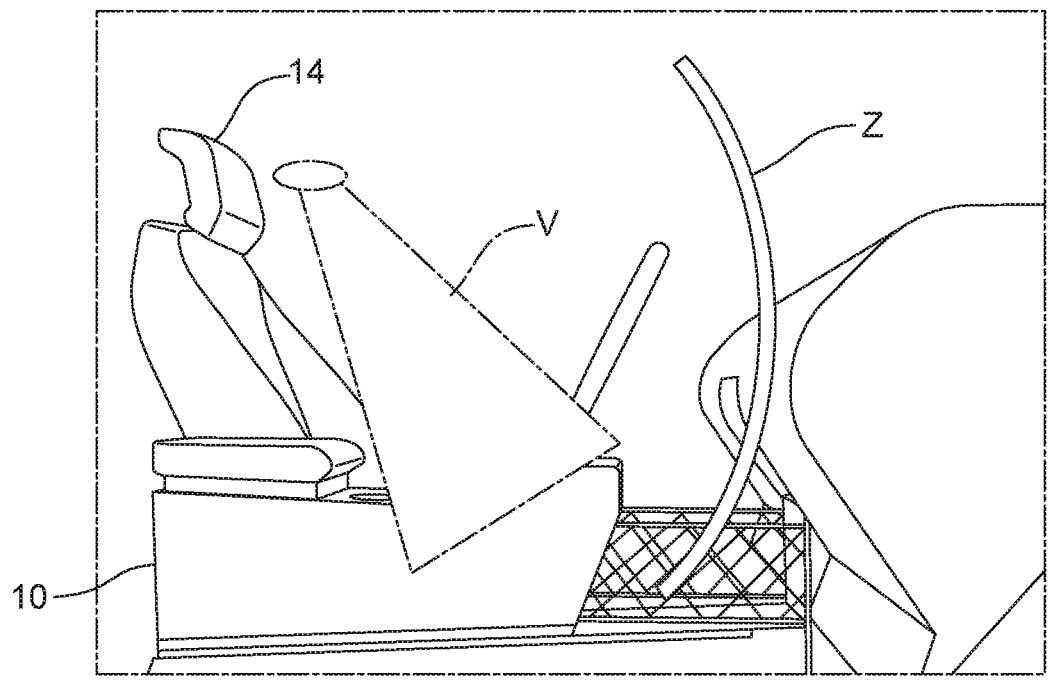
Figure 9A:
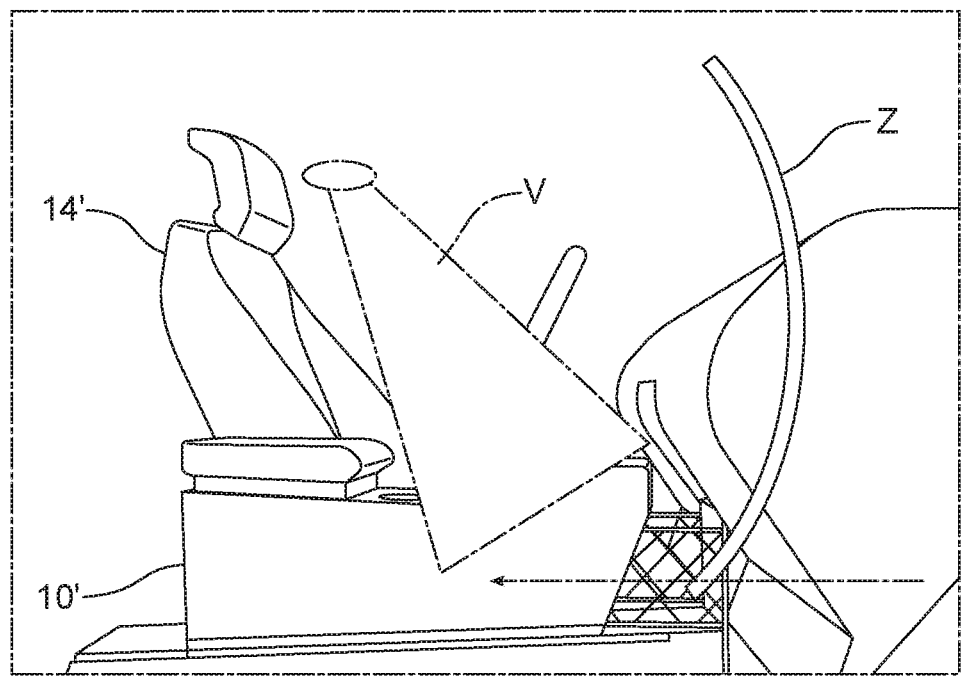
Figure 10:
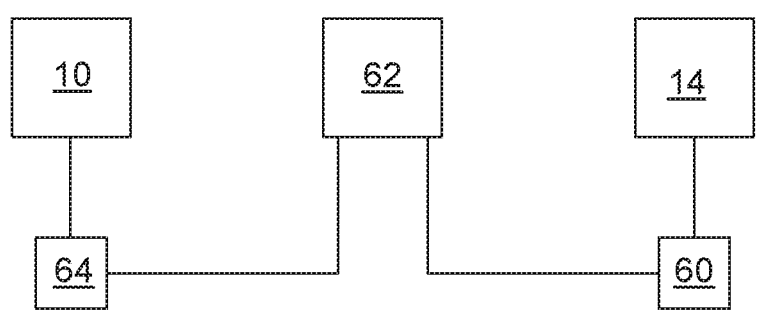

FIGS. 4, 5, and 5A illustrate the collapsible nature of the console;

FIG. 6 is a top plan view of the console;

FIGS. 7, 7A, and 7B illustrate a rear drawer with a pivoting door forming part of the console;

FIGS. 8, 8A, and 8B illustrate a holder for holding a mobile computer, which may also form part of the console;

FIGS. 9 and 9A are schematic views illustrating the reach zones and view of a driver in relation to the coupled movement of the seat and console; and FIG. 10 is a diagram illustrating an alternate embodiment for providing the coupled movement.

Reference will now be made in detail to the presently disclosed embodiments of the inventive aspects of the console, examples of which are illustrated in the accompanying drawing figures.

DETAILED DESCRIPTION

Figure 1:
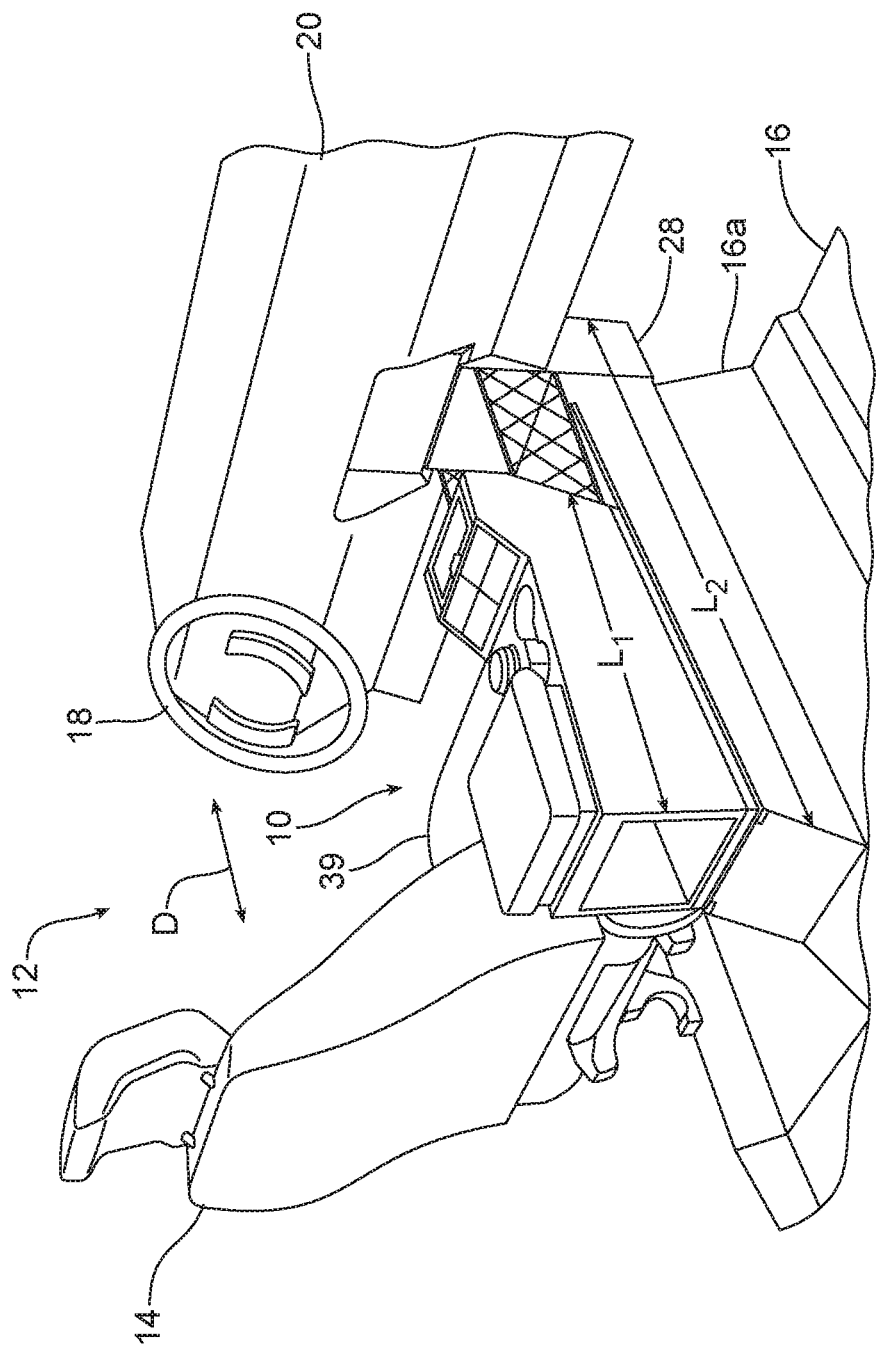
FIG. 1 is a perspective view of a passenger compartment of a vehicle including the console with coupled motion and enhance storage capabilities forming one aspect of the disclosure.
Figure 2:
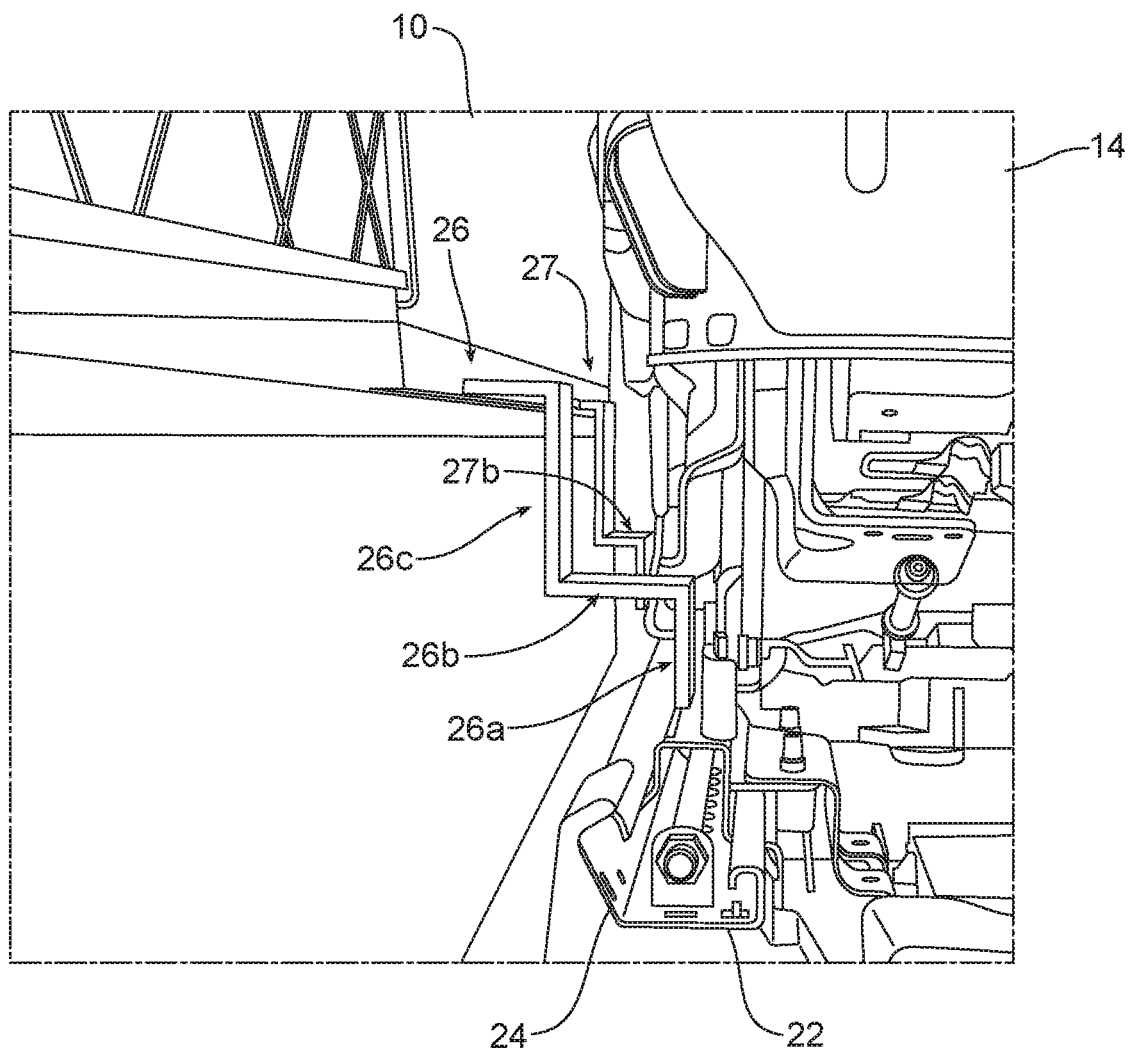
FIG. 2 is a partially cutaway view looking rearwardly from the front of the compartment, illustrating a stepped interface for connecting the seat to the console for coupled movement.

Referring now to FIGS. 1-2, a console 10 for the interior vehicle or passenger compartment 12 of a vehicle is illustrated. The passenger compartment 12 includes typical structures, such as a seat 14 for seating a driver or passenger, a floor 16 for supporting the seat, a steering wheel 18 for steering the vehicle, and a dashboard 20, which may include controls for the vehicle or otherwise. As perhaps best understood with reference to FIG. 2, the seat 14 may be mounted for moving along a guide track 22 in a travel direction D, so that the driver may move toward and away from the steering wheel 18 or other controls, such as the accelerator or brake pedals, and a suitable latch may also be provided for latching the seat in place once the desired position is reached.

According to one aspect of the disclosure, the console 10 is coupled for movement with the seat 14. As indicated in FIG. 2, which is a rearward view from underneath the seat 14, this coupling may be achieved by providing a connector between a body portion 10a of the console 10 and a support 24 for supporting the seat and engaged with the guide track 22. In the illustrated embodiment, the connector comprises a stepped interface, which may take the form of a pair of brackets 26, 27 spaced in a travel direction D of the seat 14. The first or forward bracket 26 may include a lower end portion 26a connected to the support 24 and generally upstanding therefrom, an intermediate transverse portion 26b generally perpendicular to the lower end portion 26a, and an upper portion 26c for connecting with the console 10. In particular, the upper portion 26c may extend both vertically and transversely to connect with the console 10 and, in particular, a lower portion of the body portion 10a. The second bracket 27 may include similarly oriented portions, but the intermediate portion 27b may be shorter in the transverse direction as a result of the inboard projection of a corresponding of the seat support 24 at the rear location where the connection is made. Thus, movement of the seat 14 to and fro in the travel direction D causes movement of the console 10 in a corresponding manner, the several advantages of which will be understood upon reviewing the following description.

Figure 3:
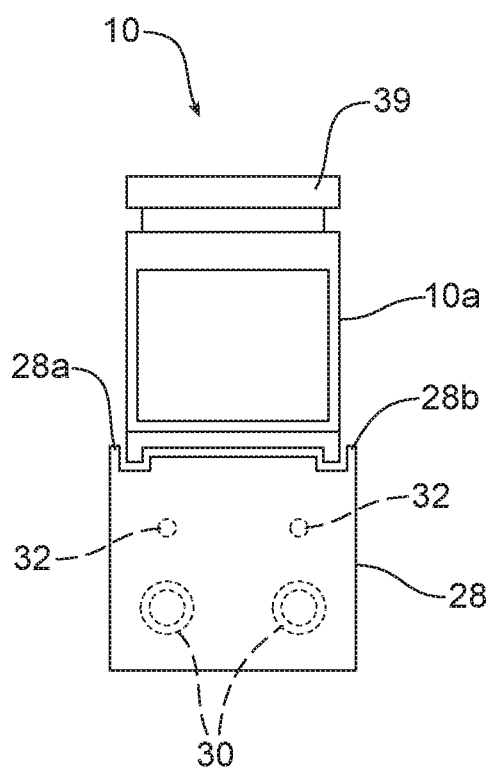
FIG. 3 is a rear view of the coupled console resting for sliding movement on a stationary base.

Referring back to FIG. 1, it can be understood that the console 10 may be supported for movement relative to a stationary base 28 which is supported by the vehicle floor 16 (and, in particular, a bolster 16a forming part of the floor). The base 28 has a length $L_1$ in the travel direction D greater than the length $L_2$ of the body portion 10a of the console 10. Thus, as the seat 14 is moved to and fro in the travel direction D, the body portion 10a of the console 10 also moves to and fro, such as by sliding along the stationary base 28. To provide guidance for achieving repeatable and reliable movement, the base 28 may include guide tracks 28a, 28b as shown in FIG. 3 for engaging part of the body portion 10a of the console 10. As further depicted, the base 28 may contain or house vehicle components, such as conduits or ducts 30 forming part of the vehicle HVAC system air, wires 32, or both, for conveyance of air or power from the forward to the rear portion of the passenger compartment 12.

According to a further aspect of the disclosure, the console 10 may also be made to expand in the travel direction D during the coupled movement. Specifically, as perhaps best understood with reference to FIGS. 4, 5, 5A, and 6, the console 10 may include a collapsible portion 10b, such as at the forward end adjacent to the dashboard 20. In one embodiment, this collapsible portion 10b comprises a pair of laterally spaced, generally parallel sidewalls 10c. Each sidewall 10c may comprise a pair of vertically spaced supports 10d for supporting a reticulated or mesh material 10e. Together with the upper surface of the base 28, the sidewalls 10c form a "pass through" storage bin for holding articles or objects that can be accessed through an open top by either the driver or passenger when seated in the corresponding seat 14.

The supports 10d may be attached at a forward end to a surface in the interior compartment, such as an upstanding portion of the base 28, but could also be attached to part of the dashboard 20. The rear ends of the supports 10d may be partially received within channels 10f, 10g formed in the lower portion of the body portion 10a, and supported inside of it. Thus, as the body portion 10a moves to and fro in the travel direction D in concert with the seat 14 as a result of the coupled movement, the sidewalls 10c may move within channels 10f, 10g (see FIG. 4) and become more fully recessed within the body portion 10a of the console 10. As can be appreciated, this reduces the resulting storage volume by an amount that depends on the relative movement (but, as discussed below, potentially enhances accessibility by improving the extent of a driver or passenger's reach). However, it is an alternative to make the supports 10d flexible and connected directly to a face of the console body portion 10a, such that the sidewalls 10c simply collapse and lower during the relative movement, rather than becoming further recessed within the body portion 10a.

As can be appreciated, forward movement in this manner may inhibit the ability of passengers in the rear of the compartment to access the console 10. To address this potential issue, the body portion 10a may optionally be provided with an extendable drawer 36. From viewing FIGS. 7 and 7A, it can be appreciated that the drawer 36 may slide rearwardly from an internal compartment in the body portion 10a of the console 10, such that in an extended position it may overlie a portion of the base 28 when the console is moved forward in concert with the seat. To facilitate access to the drawer 36 from the rear, a tilting door 38 may also be provided. The door 38 may form a closed end of the drawer in a stowed position and may pivot to a deployed position, as shown in FIG. 7B. This enhances a rear passenger's ability to access objects in the drawer 36. From a comparison of FIGS. 7, 7A, and 7B, it can also be appreciated that an upper portion of the console 10 forming an armrest 39 for the driver or passenger may be pivoted to an open condition to provide access to the drawer 36 in the stowed condition. As can be further appreciated, since the armrest 39 travels with the console 10, it is always properly positioned for use by a driver or passenger in the seat in light of the coordinated movement.

Turning to FIGS. 8 and 8A, a further aspect of the disclosure pertains to providing a console 10 with a deployable holder 40 connected to the console 10 for holding a mobile computer 42 (e.g., a "smart" phone) including a viewable display. The holder 40 may comprise an open top compartment sized and shaped for at least partially receiving the mobile computer 42 (including possibly with adapters or inserts to accommodate different sizes of devices) such that the display is facing upwardly in a stowed position of the holder within a tray 10h in the upper portion of the console 10, and body portion 10a of it in particular. A retainer, such as a tab 40a, may be provided along a rearward or lower end of the holder 40 for retaining the computer 42 in the compartment.

To deploy the holder 40, it may be moved forwardly and pivoted to an angled position, while remaining connected and supported by the console 10. To achieve this repositioning, an elongated slot 10i may extend in the console 10 along each side of the tray 10h for slidably receiving outwardly directed projections 40b extending from the holder 40 in opposed directions (see one side of the tray 10h as shown in FIG. 8b). The tray 10h may further include a notch 10j at one end for supporting the holder 40 at an angle that presents the screen of the computer 42 such that it is readily visible to the driver and passenger. Thus, the computer 42 in this position may essentially serve as an auxiliary device for allowing the driver or passenger to play media, display navigation instructions, communicate in a hands-free manner, or perhaps even view images received wirelessly from a remote camera (such as a vehicle backup camera). When not used for such purposes, the holder 40 can simply be stowed in the tray 10h by sliding the projections 40b in slots 10i. Removal of the computer 42 may also be facilitated by providing a finger-sized notch 40c in the forward end of the holder 40, which allows for the computer 42 to be easily dislodged from the compartment.

As can be appreciated from FIGS. 9 and 9A, as a result of the coupling of the seat 14 and the console 10, as well as the expansion afforded by the collapsible portion 10b, all storage locations (including cupholders and the like) and controls on the console remain within full reach of a driver or passenger. Specifically, the console 10 remains fully and consistently within "reach zone" as indicated by arcuate line Z, regardless of the repositioning of the seat 14 (compare rearward positions 10, 14 with forward positions 10', 14'). Furthermore, the upper portion of the console 10, including in particular the holder 40, remains fully within the visual field V of the driver at all times in light of the coupled movement.

With reference to FIG. 10, an alternate embodiment for providing coupled motion between a console 10 and a seat 14 is also provided without the need for a mechanical connection, such as bracket 26. In this embodiment, a seat actuator 60, such as a motor (rotary or linear), is provided for moving the seat position based on input from a driver or passenger. An indication of the position of the seat 14 based on the movement of seat actuator 60 may cause a corresponding activation of a console actuator 64, such as a similar motor, to move the console 10 in concert with the seat 14. The indication may be provided to a common controller 62, or may be transmitted directly between the actuators 60, 64 as an encoder signal. As can be appreciated, this avoids the need for a mechanical connection, and may also allow for the relative movement to be adjusted or fine-tuned by the driver or passenger using the controller 62 (such that the console 10 moves a specified amount based on the movement of the seat 14).

In summary, an improved, movable and expandable console 10 with enhanced storage, visibility, and reachability is provided. The console 10 may be connected to the vehicle seat 14 for coupled movement, either by a direct mechanical connection or an indirect connection using coupled motors, and may concurrently expand in a travel direction by moving (sliding) along a stationary base 28 supported by a floor 16 of the vehicle. A rear drawer 36 with a pivoting door 38 may be used to provide enhanced access for rear seat passengers. A holder 40 for a mobile computer 42 may also be provided such that it may remain visible to a seated driver or passenger regardless of the position of the corresponding seat 14. Overall, an improved storage arrangement is provided for the interior compartment of a vehicle, without contributing significantly to the cost or complexity of manufacture.

The foregoing description has been presented for purposes of illustration. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An apparatus for an interior vehicle compartment, comprising:
   a seat adapted for moving in a travel direction; and
   a movable console including a holder for removably receiving and holding a mobile computer having a display, the holder having a stowed position and a deployed position wherein the holder presents the display for viewing by a vehicle passenger seated in the seat in both the deployed and the stowed positions.

2. The apparatus of claim 1, wherein the console includes a tray for receiving the holder in the stowed position.

3. The apparatus of claim 2, wherein the console is adapted for guiding the holder from the stowed position to the deployed position.

4. The apparatus of claim 3, wherein the console is coupled to the seat.

5. The apparatus of claim 4, further including:
   a seat actuator for moving the seat in the travel direction; and
   a console actuator for moving the console in the travel direction in coordination with the seat.

6. The apparatus of claim 5, wherein the console includes a collapsible portion for collapsing relative to a body portion of the console.

7. The apparatus of claim 1, wherein the console is adapted for guiding the holder from the stowed position to the deployed position.

8. The apparatus of claim 7, wherein the console is coupled to the seat.

9. The apparatus of claim 8, further including:
a seat actuator for moving the seat in the travel direction; and
a console actuator for moving the console in the travel direction in coordination with the seat.

10. The apparatus of claim 9, wherein the console includes a collapsible portion for collapsing relative to a body portion of the console.

11. The apparatus of claim 1, wherein the console is coupled to the seat.

12. The apparatus of claim 11, further including:
a seat actuator for moving the seat in the travel direction; and
a console actuator for moving the console in the travel direction in coordination with the seat.

13. The apparatus of claim 12, wherein the console includes a collapsible portion for collapsing relative to a body portion of the console.

14. The apparatus of claim 1, further including:
a seat actuator for moving the seat in the travel direction; and
a console actuator for moving the console in the travel direction in coordination with the seat.

15. The apparatus of claim 14, wherein the console includes a collapsible portion for collapsing relative to a body portion of the console.

16. The apparatus of claim 1, wherein the console includes a collapsible portion for collapsing relative to a body portion of the console.

* * * * *